March 24, 1936.  H. T. KRAFT  2,035,390

APPARATUS FOR USE IN FORMING CYLINDRICAL MEMBERS OF PLIABLE MATERIAL

Filed Jan. 4, 1935

INVENTOR
Herman T. Kraft
BY
Evans & McCoy
ATTORNEYS

Patented Mar. 24, 1936

2,035,390

UNITED STATES PATENT OFFICE 2,035,390

APPARATUS FOR USE IN FORMING CYLINDRICAL MEMBERS OF PLIABLE MATERIAL

Herman T. Kraft, Akron, Ohio, assignor to The General Tire & Rubber Company, Akron, Ohio, a corporation of Ohio Application January 4, 1935, Serial No. 395

6 Claims. (Cl. 154—9)

This invention relates to building drums for use in forming cylindrical members of pliable material.

One of the objects of the present invention is to provide an improved drum for use in the formation of cylindrical articles, which is of simple and economical construction and which may be easily actuated to permit the formed article to be removed therefrom.

With the above and other objects in view, the present invention consists in certain features of construction and combinations of parts to be hereinafter described with reference to the accompanying drawing and then claimed.

In the drawing, which illustrates a suitable embodiment of the invention,

Figure 1:
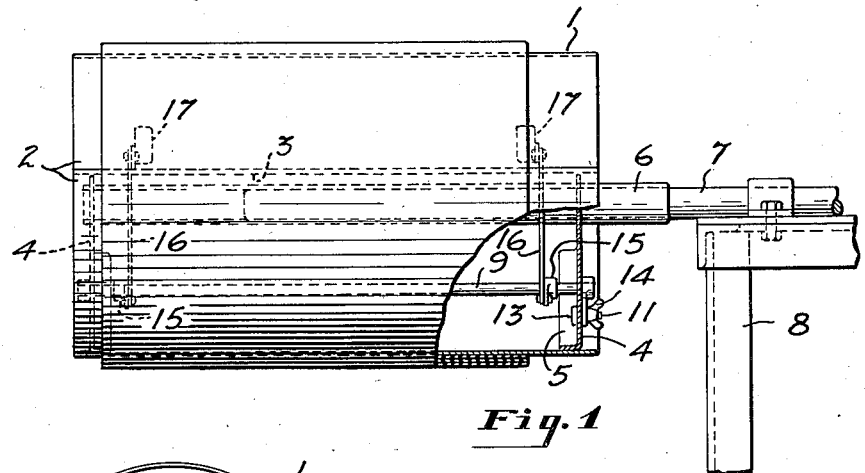
Figure 1 is a side elevation of the building drum, a portion of the same being shown in section.
Figure 2:
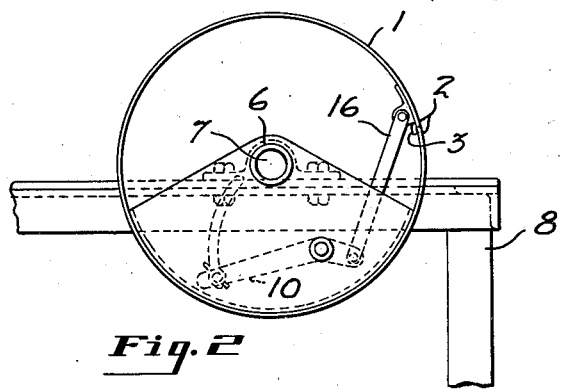
Fig. 2 is an end elevation of the drum shown in Fig. 1.

Referring to the drawing, in which like numerals refer to like parts throughout the several views, the building drum comprises a cylindrical metal shell 1 which is longitudinally split to provide normally abutting edges 2, one of the edges 2 having a lip portion 3 to overlap and substantially abut the inner surface of the other edge.

The shell 1 is provided at each end with a metallic reinforcing member 4 having a flange 5 welded or otherwise secured to the inner surface of the shell, the members 4 being of sector shape and extending from a region adjacent the split across the shell, leaving a substantial circumferential portion of the shell unreinforced, this portion being resilient, so that it may be flexed to permit the circumferential extent of the shell to be reduced.

The sector-shaped members 4 are secured in any suitable manner, such for example as welding, to a sleeve 6 arranged coaxial with the shell 1. The sleeve 6 is mounted for rotation upon a suitable mandrel 7 which is supported by and projects from a supporting frame 8.

Figure 3:
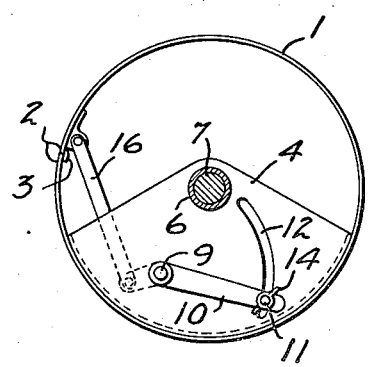
Fig. 3 is an opposite end elevation of the drum.
Figure 4:
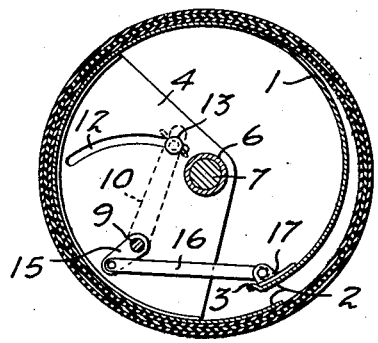
Fig. 4 is a transverse section through the drum showing the same in position to permit the removal of the formed article.

Extending between and rotatably supported by the members 4 is a shaft 9 having an arm 10 at one end outside of the adjacent reinforcing member 4, as shown in Figs. 1 and 3. The arm 10 carries a bolt 11 which extends through an arcuate slot 12 in said member 4, the bolt 11 having a head 13 which engages the inner face of the member 4 and a wing nut 14 at its threaded end to engage the face of the arm 8.

The shaft 9 is also provided with a pair of spaced levers 15 to which links 16 are pivotally connected at one end. The links 16 normally extend across the edges 2 and are pivotally connected at their other ends to brackets 17 which are welded or otherwise secured to the inner face of the shell 1 adjacent the edge 2 which carries the lip 3, i. e., the edge 2 farthest from the levers 15.

The arm 10, when the drum is in operating position, has its free end adjacent the shell 1, as shown in Fig. 3, and the lip 3 of the shell engages the inner face of the adjacent edge 2 to form the circular building surface, the wing nut 14 being tightened to lock the arm 10 against movement whereby to hold the edges of the drum in substantially abutting engagement.

The building drum is used for constructing or forming articles of pliable sheet material, and in so doing, the operator, while holding one end of the material against the drum surface, rotates the drum until the material is wrapped therearound to form the material to circular shape, after which additional material may be added in the same manner to provide a laminated structure.

After the article is formed to shape in this manner the operator loosens the wing nut 14 and swings the arm through its arc towards the sleeve 6, causing the links 16 to draw the lip carrying edge 2 inwardly and then into overlapping relation with the adjacent edge 2 to reduce the circumferential extent of the shell 1, the unreinforced portion of the shell 1 being of sufficient resiliency to permit the overlapping of the shell edges and the consequent reduction in circumference.

The formed article may then be easily removed from the drum by sliding the same longitudinally of the drum.

After the article is removed, the arm 10 is then actuated outwardly to cause the shell to assume its original shape, as shown in Fig. 1.

The building drum described is of relatively simple construction and yet it provides a means whereby the article may be easily removed therefrom.

Although a single embodiment of the invention has been herein shown and described, it will be understood that numerous details of the construction shown may be altered or omitted without departing from the spirit of this invention, as defined in the following claims.

What I claim is:

1. A building drum for use in forming cylindrical articles, comprising a cylindrical shell, said shell being longitudinally split and having the edges formed by the split normally in substantially abutting engagement, a rotatable member extending coaxially within said shell, means for supporting said rotatable member, spaced rigid shell supports secured to said rotatable member and secured to said shell throughout at least ninety degrees of the circumference thereof, the remaining circumferential portion of said shell including one of said edges being flexible, and means connected to said remaining portion for flexing said remaining portion inwardly toward said rotatable member to disengage and overlap said edges and thereby reduce the circumference of said shell.

2. A building drum for use in forming cylindrical articles, comprising a cylindrical shell, said shell being longitudinally split and having the edges formed by the split normally in substantially abutting engagement, a rotatable member extending coaxially within said shell, means for supporting said rotatable member, spaced rigid shell supports secured to said rotatable member and secured to said shell throughout at least ninety degrees of the circumference thereof, the remaining circumferential portion of said shell including one of said edges being flexible, and means connected to said remaining portion for flexing said remaining portion inwardly toward said rotatable member to disengage and overlap said edges and thereby reduce the circumference of said shell, one of said edges having an offset flange normally overlapping said shell at the other of said edges.

3. A building drum for use in forming cylindrical articles, comprising a cylindrical shell, said shell being longitudinally split and having the edges forming the split normally in substantially abutting engagement, a rotatable member extending coaxially within said shell, means for supporting said member, spaced rigid shell supports secured to said member, said shell supports being of segmental shape, the arcuate portions thereof being at least ninety degrees of the circumference of said shell and being continuously engaged with and secured to said shell, the remaining circumferential portion of said shell including one of said edges being flexible, and means connected to said remaining portion for flexing the same inwardly toward said rotatable member to disengage and overlap said edges and thereby reduce the circumference of said shell.

4. A building drum for use in forming cylindrical articles, comprising a cylindrical shell, said shell being longitudinally split and having the edges forming the split normally in substantially abutting engagement, a rotatable member extending coaxially within said shell, means for supporting said member, spaced rigid shell supports secured to said member, said shell supports being of segmental shape, and having arcuate flange portions of at least ninety degrees of the circumference of said shell, said flange portions being continuously engaged with and secured to said shell, the remaining circumferential portion of said shell including one of said edges being flexible, and means connected to said remaining portion for flexing the same inwardly toward said rotatable member to disengage and overlap said edges and thereby reduce the circumference of said shell.

5. A building drum for use in forming cylindrical articles, comprising a cylindrical shell, said shell being longitudinally split and having the edges forming the split normally in substantially abutting engagement, a rotatable member extending coaxially within said shell, means for supporting said member, spaced rigid shell supports secured to said member, said shell supports being of segmental shape, the arcuate portions thereof being at least ninety degrees of the circumference of said shell and being continuously engaged with and secured to said shell, the remaining circumferential portion of said shell including one of said edges being flexible, and means connected to said remaining portion for flexing the same inwardly toward said rotatable member to disengage and overlap said edges and thereby reduce the circumference of said shell, one of said edges having an offset flange normally overlapping said shell at the other of said edges.

6. A building drum for use in forming cylindrical articles comprising a longitudinally split, inherently flexible shell having the edges formed by the split normally in substantially abutting engagement, relatively rigid means internally engaging said shell throughout an extent of at least ninety degrees and at a region nearer one of said edges than the other whereby said shell throughout said extent will be relatively rigid, said shell throughout the remainder of its circumferential extent and including said other edge, being unreinforced and forming a flexible portion, a rotatable member, means rigidly connecting the relatively rigid portion of said shell with said rotatable member, and means connected to the flexible portion of said shell for flexing said flexible portion inwardly toward said rotatable member to disengage and overlap said edges and thereby reduce the circumference of said shell.

HERMAN T. KRAFT.